Dec. 2, 1941.  G. A. BRACE  2,264,292
REFRIGERATION
Filed July 20, 1938  3 Sheets-Sheet 1

INVENTOR
George A. Brace
BY
Harry S. Demarsz
ATTORNEY

Dec. 2, 1941.　　　G. A. BRACE　　　2,264,292
REFRIGERATION
Filed July 20, 1938　　　3 Sheets-Sheet 2
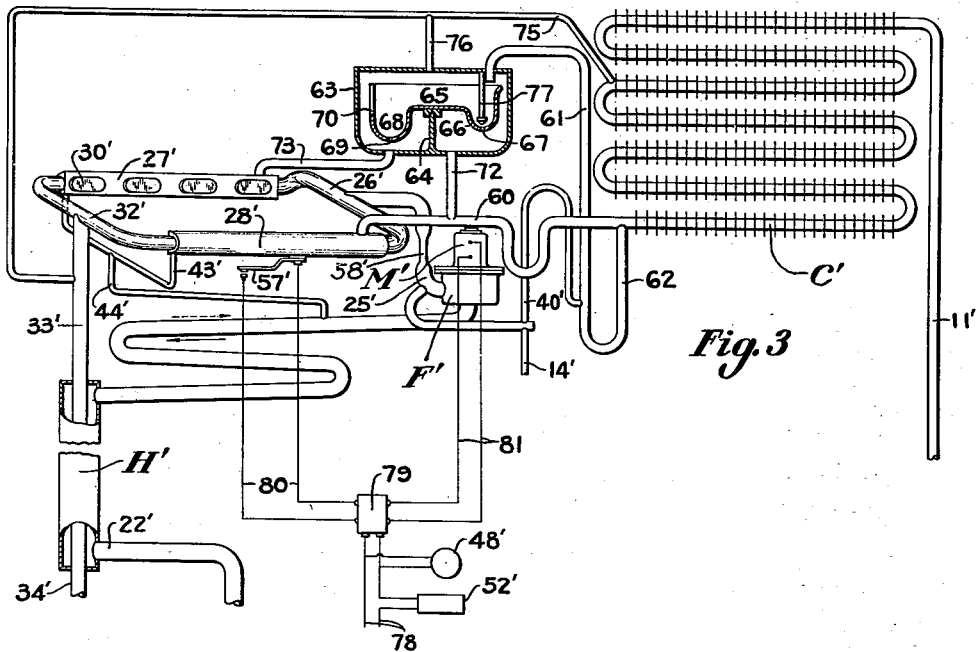
Fig.3
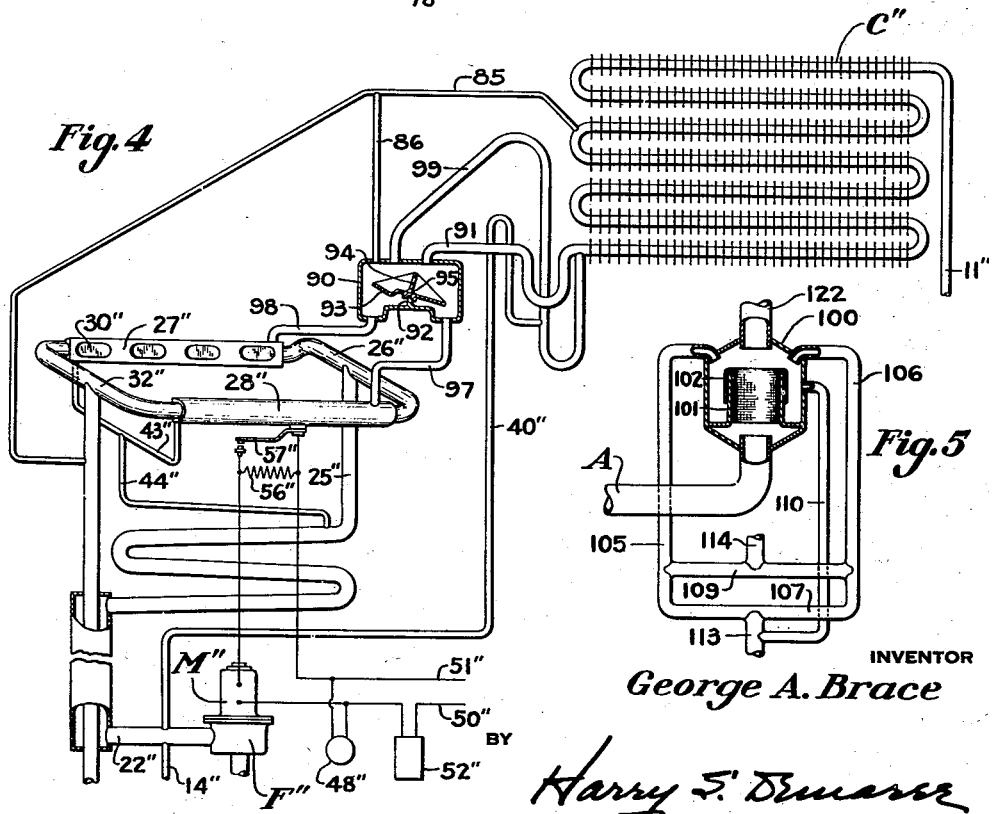
Fig.4
Fig.5
INVENTOR
George A. Brace
BY
Harry S. Bmann
ATTORNEY Patented Dec. 2, 1941

2,264,292

UNITED STATES PATENT OFFICE 2,264,292

REFRIGERATION

George A. Brace, Winnetka, Ill., assignor to The Hoover Company, North Canton, Ohio, a corporation of Ohio Application July 20, 1938, Serial No. 220,195

34 Claims. (Cl. 62—5)

This invention relates to the art of refrigeration and more particularly to a novel absorption refrigerating system characterized in that the evaporator is divided into a plurality of individual sections which perform individual functions.

It is a principal object of this invention to provide an absorption refrigerating system using inert gas in which evaporation of the liquid refrigerant is caused alternately to occur in separated portions of the evaporator for the purpose of producing ice. The evaporation of the liquid refrigerant is selectively controlled by means of a novel mechanism which causes the refrigerant liquid to be delivered to different destinations at different times by the simple expedient of altering the operating condition of the inert gas circulating fan.

It is a further object of the invention to provide mechanism which will insure proper operation of the liquid refrigerant diversion mechanism in response to an operating condition and irrespective of fluctuations induced by system disturbances.

It is another object of the invention to provide an absorption refrigerating system including an absorption solution circulating pump combined with a mechanism which insures that there shall be a substantially constant flow of absorption solution through the absorber under all operating conditions.

It is another object of the invention to provide an air cooled absorption refrigerating system utilizing a power driven circulator characterized by the fact that the cooling air flue which is normally positioned at the rear of the refrigerating compartment is extraordinarily small in depth.

It is another object of the invention to provide an absorption refrigerating apparatus in which the circulating fan for the inert gas is removed from the cooling air flue and is embedded in the removable wall element through which the evaporator is inserted into the refrigerating cabinet.

It is another object of the invention to provide an absorption refrigerating system in which the power driving element for the circulating fan is cooled by a cold inert gas stream enroute from one portion of the evaporator to another portion thereof.

Other objects and advantages of the invention will become apparent as the description proceeds when taken in connection with the accompanying drawings, in which:

Figure 3 is a fragmentary diagrammatic illustration of a modified form of the invention.

Figure 4 is a fragmentary diagrammatic illustration of another form of the invention.

Figure 5 is a diagrammatic view of a solution flow control element.

Figure 1:
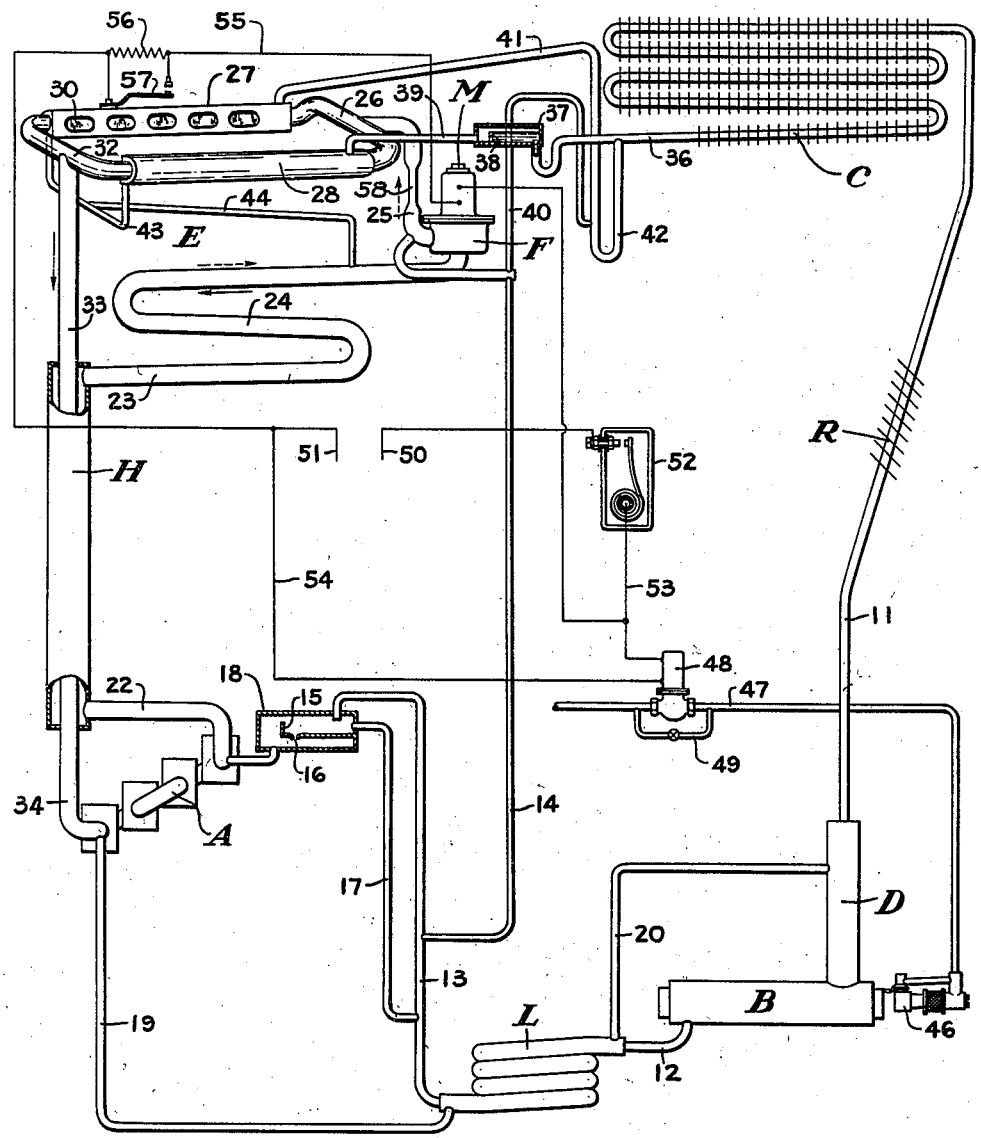
Figure 1 is a diagrammatic representation of one form of my invention applied to a refrigerating system.
Figure 2:
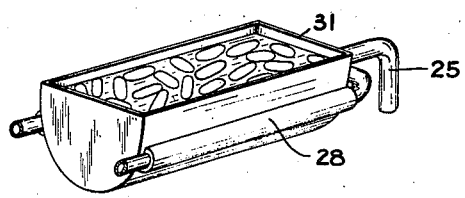
Figure 2 is a view illustrating the manner in which the ice freezing water tank is mounted upon the ice freezing evaporator coil.

Referring now to the drawings in detail and first to Figures 1 and 2 thereof, it will be seen that I have illustrated my invention as being applied to a continuous three fluid absorption refrigerating system including a boiler B, an analyzer D, an air-cooled rectifier R, an air cooled condenser C, an evaporator E, a gas heat exchanger H, an absorber A, a liquid heat exchanger L, and a circulating fan F driven by an electrical motor M. These elements are suitably connected by various conduits to form a complete refrigerating system including a plurality of gas and liquid circuits which will be defined in more detail hereinafter.

The refrigerating system just outlined will be charged with a suitable refrigerant, such as ammonia, a suitable absorbent, water, and a suitable inert pressure equalizing medium, such as nitrogen.

The boiler contains a solution of refrigerant in an absorbent from which the refrigerant is liberated as vapor when heat is applied to the boiler. Refrigerant vapor liberated in the boiler passes upwardly through the analyzer D in counter-flow relationship to strong absorption solution. Additional refrigerant vapor is generated in the analyzer from the strong solution, the heat of absorption being supplied by condensation of absorption solution vapor liberated in the boiler B. The refrigerant vapor is conveyed from the upper portion of the analyzer to the upper portion of the air cooled condenser C by means of a conduit 11 which includes the air cooled rectifier R. The rectifier R condenses any vapor of absorption solution which may pass through the analyzer.

The weak absorption solution formed in the boiler by the generation of refrigerant vapor is conducted therefrom to the upper portion of the air cooled absorber A through a conduit 12, the liquid heat exchanger L, and a conduit 13. It is apparent that the upper portion of the absorber is at an elevation considerably above the liquid level prevailing in the boiler analyzer system wherefore the weak solution must be propelled upwardly into the absorber. For this purpose a small bleed conduit 14 is interconnected between the discharge conduit of the circulating fan and the conduit 13 below the liquid level therein, whereby the absorption solution is propelled upwardly into a vessel 18 by gas lift action. The conduit 13 discharges into a cup element 15 positioned in the upper portion of the vessel 18 and provided with a small orifice 16 in its bottom portion. A drain conduit 17 is connected to the conduit 13 below the junction of the conduits 13 and 14 and opens into the cup area 15 below the level of the upper rim of the cup 15.

The combination of the cup 15, the orifice 16 and the return conduit 17 causes the apparatus to maintain a constant liquid head on the orifice 16 and therefore to provide for a constant rate of liquid flow through the absorber. This is accomplished by making the capacity of the conduit 13 slightly in excess of that required whereby the excess absorption solution will simply return to the conduit 13 through the conduit 17 for recirculation.

The weak absorption solution flows downwardly through the absorber in counterflow relationship to a mixture of refrigerant vapor and pressure equalizing medium flowing upwardly through the absorber. The refrigerant vapor is absorbed by the solution and the heat of absorption is rejected to the surrounding medium, preferably air. The resulting strong solution collects in the bottom portion of the absorber and is conveyed therefrom through a conduit 19, liquid heat exchanger L, and conduit 20 to the upper portion of the analyzer D.

The lean pressure equalizing medium formed in the absorber by the absorption of the refrigerant vapor is conducted therefrom through a conduit 22, the outer path of the gas heat exchanger H and a conduit 23 to a fast freezing coil 24 of the evaporator E. This fast freezing coil is intended to be embedded in some portion of an insulated fast freezing chamber to refrigerate the interior thereof, as shown at 29 in Figure 6. The inert gas passes through the evaporator 24 into the suction inlet of the fan F in which it is placed under pressure and is discharged through a conduit 25 into a conduit 26 which is connected to the end portions of a pair of ice freezing evaporator sections 27 and 28.

The evaporator sections 27 and 28 are simply elongated conduits provided with a plurality of spaced apart freezing pads 30 which are designed to contact the side walls of a water tank 31 whereby ice blocks are frozen within the tank 31 against those portions of the wall thereof which are in contact with the freezing pads 30 when refrigeration is produced in either one or the other of the conduits 27 and 28.

The rich pressure equalizing medium formed in the evaporator is discharged through a connecting conduit 32, conduit 33, the inner path of the gas heat exchanger H, and a conduit 34, to the bottom portion of the absorber A through which the rich mixture passes upwardly in counterflow relationship to absorption solution in the manner previously described.

The refrigerant vapor delivered to the air cooled condenser C is liquefied by heat exchange relationship with the air flowing over the condenser and is discharged therefrom through a conduit 36 into a small reservoir 37. The reservoir 37 is provided interiorly thereof with a small dam 38 which does not extend to the top portion of the reservoir and is positioned remotely from the point of connection between the reservoir and the conduit 36. Liquid refrigerant which overflows the dam 38 is discharged into the near end portion of the evaporator conduit 28 through a conduit 39.

There is also connected to the conduit 36 a conduit 41 including a U-shaped portion 42 extending below the conduit 36. The conduit 41 discharges into the evaporator section 27. A bleed-off conduit 40 is connected between the fan discharge conduit 25 and the U-shaped portion 42 of the conduit 41. The end of the evaporator conduits 27 and 28 connected to the conduit 32 are provided with a U-shaped liquid draining conduit 43 to which is connected a conduit 44 draining into the inert gas discharge portion of the fast freezing evaporator section 24.

The boiler B is heated by a suitable gas burner 46 which is supplied with fuel through a conduit 47 including a solenoid control valve 48. A small by-pass line 49 is provided around the valve 48 in order to maintain an igniting or pilot flame on the burner 46 when the valve 48 is in closed position. Electrical energy for operating the motor M and the valve 48 is supplied through the wires 50 and 51. The wire 50 connects directly to one terminal of a thermostatic switch mechanism 52 which is designed to be placed within the storage compartment of the refrigerator to respond to the temperature condition thereof and to energize or de-energize the refrigerating system as such condition demands. The other terminal of the control mechanism 52 is connected directly to the circulating motor M and the valve 48 through a wire 53. The valve 48 is also connected directly to the line 51 by a wire 54. The circulating motor M is connected directly to the line 51 through a wire 55 which includes a resistor element 56. A thermostatic switch mechanism 57 is connected to short circuit the resistor element 56 and is mounted in position to respond to the temperature condition of the evaporator conduit 27.

The operation of this form of the invention will now be described. Assuming that the apparatus has not been operated and that temperature conditions are such that there is a demand for refrigeration, the thermostatic mechanism 52 will close the circuit between the lines 50 and 53 and will therefore energize the solenoid valve to cause the burner 46 to carry a full flame and will energize the circulating motor to cause the inert gas to be circulated by the fan F. Due to the fact that the temperature in all portions of the apparatus is high, the short circuiting thermostatic switch 57 will have short circuited the resistor 56. Under these conditions, full line voltage is applied to the circulating motor M and that motor operates at its maximum speed, thereby placing the inert gas passing therethrough under maximum pressure.

When the pressure of the inert gas is at a maximum, it is sufficient to lift liquid refrigerant through the gas lift pump 41 and to discharge the same into the evaporator conduit 27 wherein a portion of the liquid refrigerant evaporates into the propelled inert gas stream and causes the formation of ice blocks on that side of the tank 31 in contact with the freezing pads 30 of the evaporator conduit 27. Any liquid refrigerant not evaporated in the evaporator conduit 27, is drained therefrom through the conduits 43 and 44 into the gas discharge portion of the fast freezing conduit 24 through which liquid refrigerant flows by gravity in counterflow relationship to the inert gas stream as it is evaporated thereinto to produce refrigeration. Any liquid refrigerant not evaporated in the conduit 24 and the balance of material which may find its way into that conduit returns to the absorber through the conduit 23, gas heat exchanger H, and conduit 22.

The operation just described continues until ice blocks of a predetermined depth have been formed within the tank 31, at which time the temperature of the pads 30 and the conduit 27 begins to fall to a very low value. As this temperature continues to fall, the thermostat 57 flexes to open the circuit position, thereby placing said resistor in circuit and reducing the voltage applied to the circulating motor M. Under these conditions, the motor no longer develops sufficient pressure to elevate liquid refrigerant through the gas lift pump 41 and all liquid discharged by the condenser then flows into the reservoir 37 and collects therein until it overflows the dam 38 and discharges into the evaporator conduit 28.

Liquid refrigerant discharged into the conduit 28 evaporates into the inert gas stream to produce refrigeration and to produce ice in the vessel 31 in the manner previously described with reference to the conduit 27. Excess liquid refrigerant is drained from the conduit 28 into the evaporator section 24 through the conduits 43 and 44 in the manner described in connection with the evaporator conduit 27.

The function of the vessel 37 and the dam 38 is to minimize fluctuations which might otherwise tend to defeat the effects of different fan speeds. For example, sudden or excessive discharges of liquid refrigerant by the condenser might cause liquid refrigerant to be discharged into the conduit 28 during periods when ice previously formed by refrigeration produced in that conduit should be melting free of the adjacent wall of the tank 31. In order to prevent this undesirable result, the reservoir 37 is provided, and the capacity of the gas lift pump 41 is made slightly greater than the normal rate of liquid discharged from the condenser, wherefore, during normal operation, the liquid level maintained in the conduit 36 and the reservoir 37 will immediately be pulled downwardly by the gas lift pump, whereby such discharges by the condenser in excess of the normal amount will simply flow into the reservoir and remain there until removed by the gas lift pump.

In operation, refrigeration is produced substantially continuously in the fast-freezing coils 24 whenever the refrigerating system is energized by the control, and refrigeration is produced alternately in the evaporator sections 27 and 38. When there is no ice in the tank 31 adjacent the evaporator section 27, the thermostat 57 short circuits the resistance coil 56, thereby causing the gas lift pump to deliver liquid refrigerant to the conduit 27. This process continues until the ice formed in the tank 31 adjacent the freezing pads 30 has reached a predetermined thickness at which time the temperature of the conduit 27 has fallen to a low value and causes the thermostat 57 to discontinue short circuiting of the resistor 56. The liquid refrigerant then discharges into the evaporator sections 28 and ice is frozen in the tank 31 in contact with the freezing pads 30 and the conduit 28. As ice is being formed in the tank 31 by refrigeration produced in the conduit 28, previously formed ice is melting free of those portions of the wall of the tank 31 contiguous to the conduit 27. This process continues until the evaporator coil 27 has been entirely freed of ice and has warmed up sufficiently to cause the thermostat 57 to again short circuit the resistor 56. By this time ice blocks of predetermined size have been frozen in the water tank 31 by refrigeration produced in the conduit 28 and these melt free of the tank 31 during periods when refrigeration is produced in the conduit 27.

The conduit 24 is maintained for the purpose of freezing or preserving foodstuffs requiring a low temperature. This low temperature is possible by reason of the fact that the lean inert gas passes directly to the conduit 24. The box is cooled by contact of the air therein with the exposed walls of the tank 31 and the conduits 27 and 28.

Due to the fact that the temperature of the walls of the tank 31 is never below freezing, except in those portions directly contiguous to the conduits 27 and 28, there is substantially no frost deposition and the humidity of the storage compartment is maintained at a high value. Any frost deposited on the tank 31 and the conduits 27 and 28 is immediately melted therefrom when refrigeration is shifted from one of said conduits to the other. Although the drawings do not show the insulated walls of compartment 29 as including all except pads 30 of conduits 26, 27, 28 and 32, it will be understood that the evaporator may be so constructed. In this event no exposed portions of the evaporator will fall below freezing temperature in normal operation, and consequently, no frost can collect.

At this point attention is called to the reduced portion 58 of conduit 25 connecting the discharge side of fan F to conduit 26 of the evaporator. This is found to be a very satisfactory way of reducing the inert gas pressure in the evaporator and of assuring that sufficient pressure is applied to the bleed conduits 14 and 40 which operate gas lift pumps 13 and 42, respectively. The same result may be obtained in other manners, such as by placing a restrictor within conduit 25, but I find that reducing the bore of the conduit for a short distance suffices without incurring the obvious disadvantages attendant the use of restrictors.

Referring now to Figure 3 of the drawings, there is disclosed a modification of the invention. Certain parts of this apparatus are identical with elements previously described and they are given the same reference characters primed. The apparatus illustrated in Figure 3 is designed and intended to be utilized with the refrigerating system disclosed in Figure 1. Therefore, it is deemed unnecessary to repeat the illustration of the complete refrigerating system.

The operation of this form of the invention is essentially the same as that disclosed in connection with Figure 1; however, certain changes in the liquid handling apparatus for the evaporator has been made in order to safeguard the apparatus against certain possible undesirable contingencies.

The liquid refrigerant condenser C' discharges through a conduit 60 containing a U-shaped loop portion. A liquid refrigerant gas lift conduit 61, including a downwardly extending U-shaped portion 62, is connected to the conduit 60 on the condenser side of the loop and discharges into a diversion chamber 63. A gas bleed-off conduit 40' is connected between the discharge conduit 25' of the circulating fan F' and the lower portion of the U-shaped part 62 of the conduit 61. The diversion chamber is divided centrally thereof by an upstanding partition 64 which terminates about half way between the bottom and top walls of said chamber.

The upper edge of the partition 64 is formed as a knife edge upon which a diversion element 65 is balanced. As viewed in Figure 3, the right hand side of the diversion element 65 is provided with a downwardly extending cupped portion 66 which has a small orifice 67 in the bottom thereof. The left hand side of the diversion element 65 has a larger cupped element 68 which is also provided with a small orifice 69 in the bottom portion thereof. A large orifice 70 is formed in the end wall of the cup 68. A drain conduit 72 is connected between the bottom of the chamber 63 on the right hand side of the partition 64 and the conduit 60. A conduit 73 is connected between the evaporator element 27' and the bottom of the chamber 63 on the left hand side of the partition 64.

The condenser C is provided with a purge vent 75 to the rich gas conduit 33'. The diversion chamber 63 is vented to the conduit 75 by a conduit 76 which serves to relieve the vessel 63 of vapors and of gas discharged through the gas lift pump 61.

Electrical energy is supplied to the circulating motor M' through a pair of supply lines 78 which are connected into any suitable form of motor speed changing mechanism 79. A box temperature thermostatic control 52' is inserted in one of the wires 78, and the solenoid gas valve 48' is connected across the wires 78 to be controlled by the thermostatic control 52'. The mechanism 79 may be a voltage regulator, phase regulator, frequency changer or other suitable speed regulating mechanism. The mechanism 79 is energized to decrease the motor speed below the value it has when placed directly across the line and is connected to the thermostat 57' by a pair of wires 80. The motor is connected to the mechanism 79 by a pair of wires 81. The arrangement is such that the thermostatic element 57' closes the circuit through the wires 80 to cause an increase in motor speed whenever ice blocks have been frozen to the predetermined depth in the water tank adjacent the refrigerator conduit 28'. When this occurs, the circulating fan F' generates sufficient pressure to elevate liquid refrigerant through the gas lift pump conduit 61 into the cup 67 of the diversion element 65 which is housed in the chamber 63.

The operation of this form of the invention is as follows: Assuming that the apparatus has been operating and that ice blocks have been frozen to the desired depth in that portion of the water tank contiguous to the evaporator conduit 28', the bi-metallic element 57' will close the circuit through the wires 80 and the mechanism 79 will increase the motor speed sufficiently to cause the gas pressure to elevate liquid refrigerant into the chamber 63 through the conduit 61. The liquid refrigerant so elevated will discharge into the cup member 66 at a rate very greatly in excess of the rate at which liquid can escape through the orifice 67. The liquid which escapes through the orifice will be discharged into the conduit 60 through the conduit 72. Continuous discharge of the liquid into the cup 66 will eventually fill that cup and cause the liquid to overflow into the cup element 68 from which a small portion of the liquid will escape through the orifice 69 and will be discharged into the conduit 27' through the conduit 73. As the liquid collects in the cup element 68, the diversion member 65 is overbalanced and the orifice 67 is closed by a valve element 77 which is fixed to the top wall of the housing 63. After the cup 68 has become substantially filled with liquid any further liquid flowing thereinto discharges through the side wall orifice 70 and flows through the conduit 73 into the evaporator conduit 27' in which refrigeration occurs to produce ice blocks in that portion of the tank 31 contiguous to the conduit 27'. This operation continues until the ice blocks in contact with that portion of the tank 31' contiguous to the evaporator conduit 28' have melted free therefrom, whereupon the conduit 28' increases in temperature and eventually causes the thermostat 57' to open circuit wires 80. Immediately this occurs, the speed of the motor M' is decreased and the fan no longer generates sufficient gas pressure to elevate liquid refrigerant into the diversion chamber. Any liquid remaining in the cup element 68 drains therefrom into the conduit 73 and the diversion element 65 returns to the position shown in Figure 3. The liquid refrigerant discharged by the condenser now flows directly through the conduit 60 into the conduit 28' in which refrigeration occurs to produce ice blocks in the associated portions of the tank 31' until the ice reaches a predetermined depth and the temperature of the conduit 28' lowers sufficiently to again cause the thermostatic element 57' to close the circuit through the wires 80.

It sometimes occurs that a small amount of liquid will be elevated through the gas lift pump even when the fan motor is operating at a low speed due to fluctuations in the system either in the inert gas circuit or in the discharge of liquid by the condenser. It would be very undesirable to have this liquid discharged into the opposite evaporator section and for this reason the orifice 67 is provided which will permit such liquid simply to return directly to the conduit 60 and to the appropriate portion of the evaporator.

Referring now to Figure 4, there is disclosed a third modification of the invention. This form of the invention is designed and intended to be utilized with the refrigerating system disclosed in Figure 1 and therefore the complete system has not been illustrated. Certain parts of this apparatus are identical with parts disclosed in Figure 1 and are given the same reference characters double primed.

The condenser C'' discharges into the upper portion of a diversion chamber 90 through a conduit 91 which includes a U-shaped loop portion. The chamber 90 is provided centrally thereof with an upstanding dividing partition and knife edge element 92 upon which a diversion bucket 93 is mounted. The bucket 93 is divided into two chambers by an upstanding partition 94 which is provided with a small opening 95 in the central bottom portion thereof. As viewed in Figure 4, the right hand side of the chamber 90 is connected into the inert gas inlet end of the conduit 28'' by a conduit 97, and the left hand side of the diversion chamber is connected to the inert gas inlet end of the evaporator section 27" by a conduit 98.

The condenser discharge conduit 91 opens into the diversion chamber 90 on the right hand side thereof; that is, in position to tilt the bucket 93 to cause the same to discharge its contents into the conduit 97. A gas lift conduit 99 which includes an upstanding loop portion is connected between the condenser side of the loop in the conduit 91 and the left hand side of the diversion chamber 90 whereby the discharge thereof will tilt the bucket to the left, as viewed in Figure 4, to discharge the contents into the conduit 98. The bleed conduit 40" opens into a depending U-shaped portion of the gas lift conduit 99.

The drive motor M" for the circulating fan F" is connected to the source of electrical energy, box control, speed control and gas valve in the same manner in which the motor M, disclosed in Figure 1, is connected to the corresponding elements.

The vent conduits 85 and 86 correspond respectively to the vent conduits 75 and 76 disclosed in connection with Figure 3.

The operation of this form of the invention is substantially the same as that disclosed in connection with the two forms of the invention previously described. However, the diversion element disclosed here, as is the case with bucket 65 of Fig. 3, possesses the advantage that it absolutely prevents discharge of liquid refrigerant into the inactive side of the evaporator from whatever cause such discharge might arise. For example, if the condenser should discharge an extraordinarily large quantity of refrigerant liquid during periods when the control has short circuited the resistor 56", thus indicating a demand for refrigeration in the evaporator conduit 27", a portion of this liquid might flow through the loop in the conduit 91 and discharge into the bucket 93. But under these conditions that liquid would simply pass through the opening 95 into the left hand side of the diversion element 93 and would thus find its way into the operative evaporator conduit 27". On the other hand, if such a discharge occurred during a period when evaporation was occurring in the conduit 28", the liquid held in the gas lift conduit 99 might be raised sufficiently to cause the liquid to be pumped therethrough even at the low gas pressure then prevailing. If this should occur, liquid discharged through the conduit 99 would be discharged into the left hand end of the diversion element 93 and would then flow through the hole 95 and conduit 97 into conduit 28". The opening 95 is not large enough to accommodate the normal flow of liquid refrigerant from the condenser. Therefore the diverter 93 quickly tilts to its proper position when the control mechanism causes a substantially normal discharge from either conduit 91 or 99. Therefore, this form of the invention provides a system in which all liquid discharged by the condenser finds its way into the proper evaporator section regardless of abnormal conditions in the liquid or gas circuits from whatever cause such conditions may arise.

Referring now to Figure 5, there is disclosed a modification of the absorption solution flow control mechanism. The regulating mechanism disclosed in connection with Figure 1 has the advantage that it is simple and easy to manufacture. However, there is some danger that the small orifices 16 may become clogged with solid matter circulating within the refrigerating system. In order to overcome this possibility, the absorption liquid flow into the absorber is regulated by a wick. The device illustrated in Figure 5 is shown in connection with a tubular absorber of the finned air cooled type. This device comprises a chamber 100 within which there is mounted an annular chamber-forming element 101. An annular wick 102 overhangs each side of the wall 101 to form a means for conveying liquid from the space between the wall 101 and the inner wall of the chamber 100 into the space defined by the wall 101. The bottom portion of the chamber 100 is connected to the upper conduit of the absorber A and the upper portion of that chamber is connected to the lean gas return conduit 122 which corresponds to the conduit 22 of Figure 1. Weak absorption solution is conveyed from the liquid heat exchanger through the conduit 113, which corresponds to conduit 13 in Figure 1, into a twin gas lift pump which comprises a pair of elevating conduits 105 and 106 opening into opposite sides of the chamber 100 and which are connected together to the conduit 113 at their lower ends by conduit 107. Pumping gas is injected into the conduits 105 and 106 by a connecting conduit 109 which is connected to a bleed conduit 114 corresponding with the conduit 14 disclosed in Figure 1. In consequence of this construction, lean absorption solution is alternately discharged into the annular chamber formed between the compartment wall 100 and the wall 101. This liquid then is carried over the edge of the wall 101 by the wick and falls into the absorber through which it flows by gravity. The capacity of the elevating conduits 105 and 106 is greater than the capacity of the wick 102 and the rate at which absorption liquid is supplied to the conduit 113. Liquid is permitted to collect between the walls 100 and 101 until it reaches the level of the overflow conduit 110 which returns excess liquid into the conduit 113 to be recirculated by the pump.

By reason of this construction, a substantially constant head of absorption liquid is maintained on the wick whereby a substantially constant rate of absorption liquid flow to the absorber is attained regardless of fluctuation in liquid supplied to the conduit 113 or in the rate of flow of the inert gas stream. This construction is highly advantageous for the reason that the wick will not clog nor lose its calibration in use, and it provides a simple and inexpensive means of insuring constant absorption liquid flow through the absorber.

Figure 6:
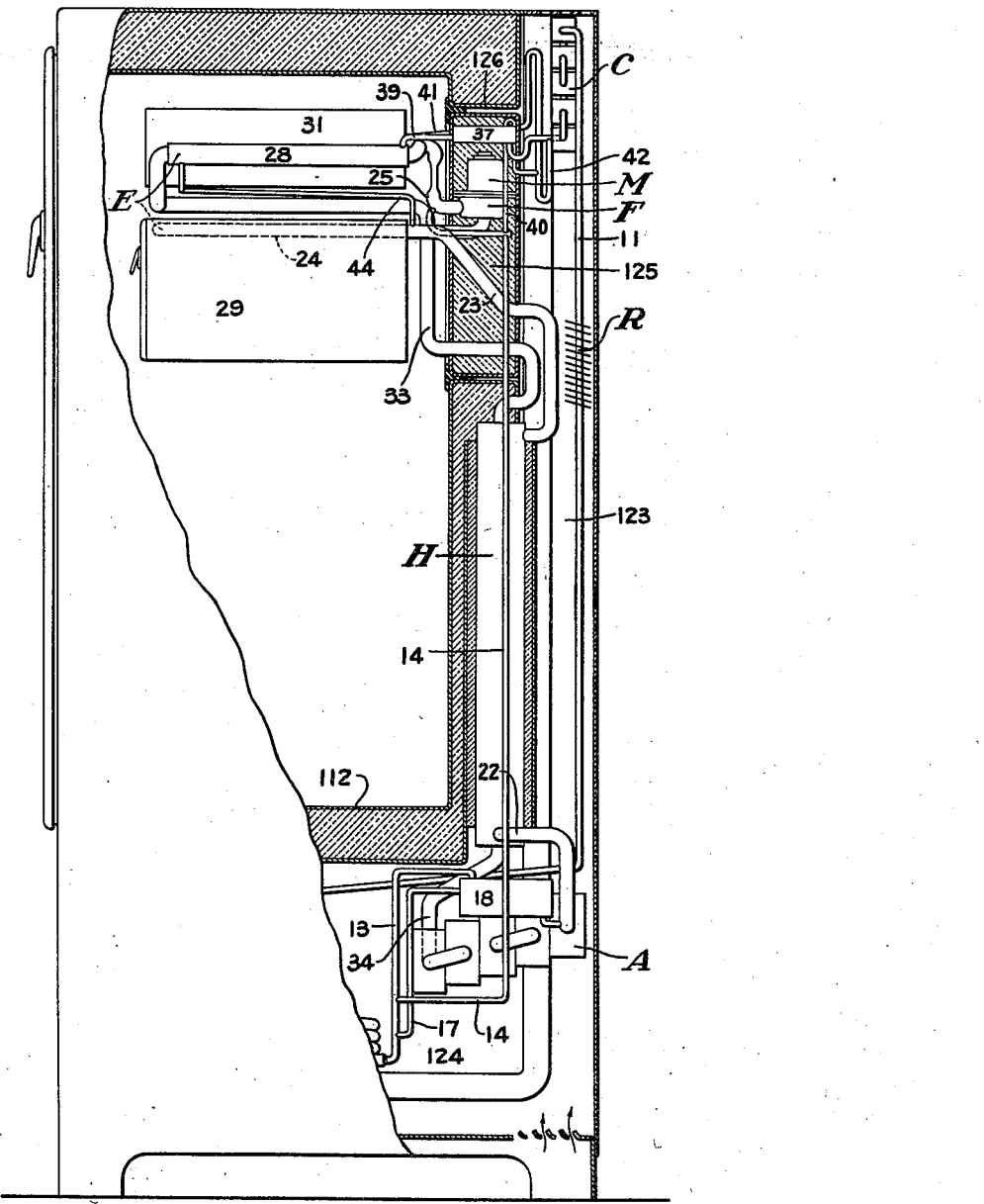
Figure 6 is a view illustrating the manner in which the various elements of the refrigerating system are mounted within the cabinet of a domestic refrigerator.

Referring now to Figure 6, the arrangement of the elements of the refrigerating system within the cabinet are illustrated. The cabinet comprises a refrigerating cabinet 112 on which suitable panels are mounted to form a rear cooling flue 123 and a lower mechanism compartment 124. The absorber A, herein shown as of an inclined tubular finned air cooled type, is mounted in the rear portion of the compartment 124 and has a portion thereof beneath the bottom portion of the air flue 123. The condenser C and the rectifier R are mounted in the flue 123 to be cooled by cooling air flowing therethrough. Cooling air may be led into the mechanism compartment and air flue in any suitable manner; as illustrated, louvres are shown in the bottom wall of the compartment 124 to admit air from adjacent the floor. The evaporator E is mounted in the top rear portion of the cabinet 112 in front of a readily removable window panel 125 in which the circulating motor M is embedded. The gas heat exchanger H is suitably embedded in the rear wall of the compartment 112 which is composed of insulating material.

The evaporator section 24 is illustrated in Figure 6 as being encased in an insulated low temperature storage or dessert freezing chamber 29 which underlies the water tank 31.

The apparatus is arranged to be constructed as a unit so that the entire refrigerating system and the window panel 125 may be mounted in the cabinet by passing the evaporator through an opening 126 in the rear wall of the cabinet 112 and positioning the panel 125 in that opening. The rear panel forming the air flue may then be attached to the cabinet in any suitable manner.

By this arrangement the circulating motor is cooled by the cold gas passing from the fast freezing evaporator 24 into the ice freezing evaporator sections 27 and 28 and heat loss from these parts is prevented by the insulation of the panel 125.

A very particular object of this construction, however, is to narrow the flue 123 as much as possible. Heretofore this flue has been unnecessarily deep because it had to be wide enough to accommodate the circulating motor which has a diameter of from 4 to 6 inches. By placing the motor within the panel 125, it is cooled by the refrigerating system and the flue 123 need be only wide enough to accommodate the condenser C which is relatively very narow.

The invention herein disclosed provides an apparatus whereby ice blocks may conveniently be formed within a body of water and alternately in different portions of that body of water by the simple expedient of altering the speed of a circulator included within the refrigerating system. Refrigeration is produced alternately in different sections of an ice freezing evaporator, but it is produced substantially continuously in another section of the evaporator which functions to refrigerate an insulated low temperature storage or fast freezing compartment. Additionally, the walls of the water tank refrigerate the main food storage compartment of the refrigerator, and, since they operate at a relatively high temperature, the humidity within the refrigerator is maintained within proper limits.

By placing the circulating motor between the two sections of the evaporator, a convenient arrangement is had whereby the motor is cooled by the cold gases flowing through the fan and the whole apparatus may conveniently be mounted within the insulation forming a part of the window panel for closing the window formed in the rear walls of the refrigerating compartment through which the evaporator is inserted. This is particularly advantageous because it provides for positive cooling of the circulating motor and at the same time permits the motor to be removed from the cooling air flue which is normally at the rear of the refrigerating cabinet, whereby that flue may be made just wide enough to accommodate the condenser with a consequent saving of several inches of space. This saving is highly important because space limitations of domestic refrigerating cabinets are extremely rigid and any space or depth saved on the air cooling flue can very conveniently be utilized in other portions of the cabinet, for example, as by making the food storage compartment a few inches deeper.

The herein disclosed systems provide structures which permit the diversion of the liquid refrigerant to be accomplished with a very small change in fan speed. The embodiments of the invention disclosed in Figures 3 and 4 are particularly well suited to operate on small fan speed differentials. For example, the system may be designed so that the fan develops just sufficient gas pressure to elevate the liquid refrigerant through the gas lift pumps 61 and 97 at maximum speed. Therefore, a very small reduction in fan speed will cause these pumps to cease operating. Any refrigerant elevated through these pumps at low fan speed due to condenser surges or other transient conditions in the system, will be returned to its proper environment in the system by the orifice 67 and conduit 72 (Figure 3) or the by-pass 95 (Figure 4).

The motor speed control is under the control of the box temperature control 52. This feature relates the ice production to seasonal demand as follows: During periods of warm weather the heat loss from the refrigerator cabinet increases and thus causes more frequent operation of the refrigerating mechanism. This produces a greater quantity of ice as the ice production is a function of the operating time of the refrigerating mechanism. The tank 31 provides a convenient ice storage vessel from which any desired number of ice blocks may be removed with a ladle as needed.

Additionally, there is disclosed two mechanisms whereby the flow of absorption solution through the absorber may be kept substantially constant regardless of system fluctuation or regardless of changes in the speed of the circulating fan induced by the control mechanism.

While the invention has been disclosed in considerable detail, it is not limited to the structure shown and described, but it may be embodied in numerous other constructional forms and variations without departing from the spirit of the invention or the scope of the appended claims.

I claim:

1. Refrigerating apparatus comprising a pressure equalizing medium circuit including a plurality of evaporator sections and an absorber, power driven means for circulating the pressure equalizing medium through said circuit, means for delivering liquid refrigerant to one of said evaporator sections, a gas lift pump connected to take liquid refrigerant from said delivery means and to deliver the same to another of said evaporator sections, means for diverting pressure equalizing medium from said pressure equalizing medium circuit for operating said pump, a water container mounted in heat exchange relationship with said evaporator sections, means for increasing or decreasing the speed of said power driven means in accordance with the temperature condition of one of said evaporator sections, said last mentioned means being constructed and arranged to maintain one speed condition of said power driven means while ice is being formed within those portions of the water tank contiguous to one of its associated evaporator sections and to maintain another speed condition of said power driven means after ice blocks of a predetermined depth have been formed in said water tank, said gas lift pump being operable only when said circulating means is operating at the higher of said two speeds whereby refrigerant is alternately discharged into said evaporator sections.

2. Refrigerating apparatus including a condenser, an evaporator having a pair of spaced apart evaporating sections, a water tank mounted in contact with said sections, a power driven means for propelling an inert gas through said evaporator sections, means for conveying refrigerant liquid from said condenser to one of said evaporator sections, a gas lift pump connected to receive inert gas from said fan for conveying liquid refrigerant from said condenser to the other of said evaporator sections, and control means for causing said fan to operate for a period of time at a speed insufficient to generate sufficient gas pressure to operate said gas lift pump whereby refrigeration will be produced in said first-mentioned evaporator section, said control means being operative to increase the speed of said fan sufficiently to cause said gas lift pump to operate to discharge liquid refrigerant into said second-mentioned evaporator section after ice blocks of a predetermined thickness have been formed within said water tank adjacent said first-mentioned evaporator section.

3. Refrigerating apparatus including a condenser, an evaporator having a pair of spaced apart evaporating sections, a water tank mounted in contact with said sections, a power driven means for propelling an inert gas through said evaporator sections, means for conveying refrigerant liquid from said condenser to one of said evaporator sections, a gas lift pump connected to receive inert gas from said fan for conveying liquid refrigerant from said condenser to the other of said evaporator sections, and control means for causing said fan to operate for a period of time at a speed insufficient to generate sufficient gas pressure to operate said gas lift pump whereby refrigeration will be produced in said first-mentioned evaporator section, said control means being operative to increase the speed of said fan sufficiently to cause said gas lift pump to operate to discharge liquid refrigerant into said second-mentioned evaporator section after ice blocks of a predetermined thickness have been formed within said water tank adjacent said first-mentioned evaporator section, and a reservoir connected between said evaporator and condenser and operable to prevent liquid refrigerant from discharging into an inoperative evaporator section.

4. Refrigerating apparatus including a condenser, an evaporator having a pair of spaced apart evaporating sections, a water tank mounted in contact with said sections, a power driven means for propelling an inert gas through said evaporator sections, means for conveying refrigerant liquid from said condenser to one of said evaporator sections, a gas lift pump connected to receive inert gas from said fan for conveying liquid refrigerant from said condenser to the other of said evaporator sections, and control means for causing said fan to operate for a period of time at a speed insufficient to generate sufficient gas pressure to operate said gas lift pump whereby refrigeration will be produced in said first-mentioned evaporator section, said control means being operative to increase the speed of said fan sufficiently to cause said gas lift pump to operate to discharge liquid refrigerant into said second-mentioned evaporator section after ice blocks of a predetermined thickness have been formed within said water tank adjacent said first-mentioned evaporator section, a diversion chamber interposed between said gas lift pump and said second-mentioned evaporator section, means within said chamber operative to return sporadic liquid discharges from said pump to said first-mentioned evaporator section, means for conveying continuous liquid discharges into said second-mentioned evaporator section, and means for blocking said return means when said gas lift pump continuously discharges liquid refrigerant into said chamber.

5. Refrigerating apparatus comprising a pressure equalizing medium circuit including a plurality of evaporator sections and an absorber, power driven means for circulating a pressure equalizing medium through said circuit, a water tank mounted in heat exchange relationship with said evaporator sections, a control chamber connected to each of said evaporator sections, a condenser, a gravity flow connection between said condenser and said chamber, a gas lift pump operated by said circulating means connected between said condenser and said chamber, temperature responsive control means for regulating the speed of said power driven means to allow liquid to be delivered from said condenser to said chamber through said gravity connection when said motor is operating at a low speed and to cause liquid to be delivered through said gas lift pump when said motor is operating at high speed, means within said chamber for directing liquid discharged by said gravity connection into one section of said evaporator and for discharging liquid supplied through said gas lift pump to the other of said evaporator sections, and means for directing sporadic or abnormal discharges from either of said condensate supply means into its appropriate evaporator section irrespective of the speed of said circulating means.

6. Refrigerating apparatus comprising a pressure equalizing medium circuit including a plurality of evaporator sections and an absorber, a solution circuit including a generator and said absorber, power driven means for circulating a pressure equalizing medium through said pressure equalizing medium circuit, a gas lift pump for circulating solutions through said solution circuit, means diverting pressure equalizing medium from said pressure equalizing medium circuit for operating such gas lift pump, a water tank mounted in heat exchange relationship with said evaporator sections, means for liquefying refrigerant vapor generated in said boiler, means providing for gravity flow of liquid refrigerant from said liquefying means to one of said evaporator sections, a gas lift pump connected to receive inert gas from said circulating means for conveying liquid refrigrant from said liquefying means to the other of said evaporator sections, control means for regulating the operation of said circulating means to cause the same to circulate the pressure equalizing medium at a pressure insufficient to operate said second-mentioned gas lift pump for a period of time whereby refrigeration will be produced in said first-mentioned evaporator section and to cause said circulating means to generate sufficient pressure to operate said gas lift pump to discharge liquid refrigerant into said second-mentioned evaporator section after ice blocks of a predetermined thickness have been formed in said water tank adjacent said first-mentioned evaporator section, and means providing for a substantially constant flow of absorption solution through said absorption solution circuit independently of variations in the pressure of the pressure equalizing medium supplied to said first-mentioned gas lift pump.

7. Refrigerating apparatus comprising a pressure equalizing medium circuit including a plurality of evaporator sections and an absorber, power driven means for circulating a pressure equalizing medium through said circuit, a water tank mounted in heat exchange relationship with said evaporator sections, a control chamber connected to said evaporator section, a condenser, a gravity flow connection between said condenser and said chamber, a gas lift pump operated by said circulating means connected between said condenser and said chamber, temperature responsive control means for regulating the speed of said power driven means to permit liquid to be delivered from said condenser to said chamber through said gravity connection when said motor is operating at a low speed and to propel liquid from said condenser through said gas lift pump when said motor is operating at high speed, means within said chamber for directing liquid discharged by said gravity connection into one section of said evaporator and for discharging liquid supplied through said gas lift pump to the other of said evaporator sections, and means for directing sporadic or abnormal discharges from said gravity flow connection or said gas lift pump into its appropriate evaporator section irrespective of the speed of said circulating means, said pressure equalizing medium circuit also including an evaporator freezing section connected between said absorber and said power driven means, and means for draining unevaporated liquid refrigerant from each of said first-mentioned evaporator sections into said freezing evaporator section, the arrangement being such that cold pressure equalizing medium flows from said freezing evaporator section to said first-mentioned evaporator section through said power driven circulating means to cool the same.

8. Refrigerating apparatus comprising a cabinet including an insulated storage chamber, means spaced from one wall of said cabinet to form a cooling air flue therewith, a condenser in said flue, means forming a pressure equalizing medium circuit including an absorber positioned beneath said chamber, an evaporator mounted within said chamber, and a power driven circulator embedded in a wall of said chamber, said evaporator comprising a low temperature freezing section and a pair of spaced ice-freezing sections, means connecting said circulator to receive pressure equalizing medium from said first-mentioned section and to discharge the same into said second-mentioned sections, means for generating refrigerant vapor and conveying the same to said condenser, control means for causing liquid refrigerant to discharge from the condenser alternately into said second-mentioned evaporator sections, means for draining unevaporated liquid refrigerant from each of said second-mentioned evaporator sections into said first-mentioned section, and means responsive to temperatures within said compartment for governing the operation of said control means.

9. That improvement in the art of refrigeration which includes the steps of propelling a pressure equalizing medium through a plurality of evaporating zones, conveying liquid from a source of supply to one of said zones by gravity, conveying liquid from the source of supply to another of said zones by a pump operated by pressure equalizing medium diverted away from said zones, and controlling the destination of liquid discharged from the source of supply by regulating the pressure of the diverted pressure equalizing medium in accordance with demands for refrigeration.

10. Refrigerating apparatus comprising a solution circuit including a boiler and an absorber, a cooling medium circuit including said boiler and absorber and a cooling unit, means for elevating weak solution to the level of said absorber, means for allowing a predetermined quantity of such solution to flow through said absorber, and means for returning excess solution to said elevating means.

11. Refrigerating apparatus comprising a solution circuit including a boiler and an absorber, a cooling medium circuit including said boiler and absorber and a cooling unit, means for elevating weak solution to the level of said absorber, a metering element for discharging such solution into said absorber, and means for maintaining a substantially constant head of such solution on said metering element.

12. Refrigerating apparatus comprising a solution circuit including a boiler and an absorber, a cooling medium circuit including said boiler and absorber and a cooling unit, means for elevating weak solution to the level of said absorber, a metering element for discharging said solution into said absorber, and means for maintaining a substantially constant head of said solution on said metering element, said metering element comprising an orifice.

13. Refrigerating apparatus comprising a solution circuit including a boiler and an absorber, a cooling medium circuit including said boiler and absorber and a cooling unit, means for elevating weak solution to the level of said absorber, a metering element for discharging said solution into said absorber, and means for maintaining a substantially constant head of said solution on said metering element, said metering element comprising a wick.

14. Refrigerating apparatus comprising a solution circuit including a boiler and an absorber, a cooling medium circuit including said boiler and absorber and a cooling unit, a twin gas lift pump for elevating absorbing solution to the level of said absorber, a metering element for discharging the solution into said absorber, and means for maintaining a substantially constant head of the solution on said metering element.

15. Refrigerating apparatus comprising an insulated cabinet having an opening formed in one wall thereof, means spaced from said wall and forming a cooling air flue therewith, a refrigerating unit including a multiple section evaporator mounted within said cabinet, an air cooled condenser mounted in said flue and connected to said evaporator, an absorber mounted beneath said insulated cabinet, means for supplying refrigerant vapor to said condenser, means connecting said absorber and evaporator to form a pressure equalizing medium circuit, a power driven circulator connected between two of said evaporator sections to circulate a pressure equalizing medium through said circuit, and an insulated panel for closing said opening, said power driven circulator being embedded in said panel.

16. Refrigerating apparatus comprising an insulated cabinet having an opening formed in one wall thereof, means spaced from said wall and forming a cooling air flue therewith, a refrigerating unit comprising a pressure equalizing medium circuit including an evaporator mounted within said cabinet, a gas heat exchanger embedded in a wall of said cabinet, an absorber, and a driven pressure equalizing medium circulator, means for supplying a refrigerant liquid to said evaporator including an air-cooled condenser in said flue, and an insulated panel mounted in said wall opening and enclosing said motor.

17. Refrigerating apparatus comprising an evaporator including a pair of sections, means for supplying a cooling medium to said evaporator, power driven means for propelling a pressure equalizing medium through said sections, means for altering the pressure at which said pressure equalizing medium is supplied to said sections in accordance with the temperature condition of one of said sections, and means for directing the cooling medium into one or the other of said sections in accordance with said pressure.

18. Refrigerating apparatus comprising an evaporator including a plurality of sections, means for supplying a cooling medium to said evaporator, power driven means for propelling a pressure equalizing medium through said sections, means for altering the pressure at which said pressure equalizing medium is supplied to said sections in accordance with the temperature condition of one of said sections, means for directing said cooling medium into one of said sections when the pressure of the pressure equalizing medium is at a low value and for directing said cooling medium into another of said sections when the pressure of the pressure equalizing medium is at a high value.

19. Refrigerating apparatus comprising a cabinet including an insulated storage chamber and an apparatus compartment, a cooling unit in said chamber, a cooling medium supply mechanism for said cooling unit, said supply mechanism including a power driven circulator embedded in the insulation of said insulated storage chamber, and a heat rejecting portion in said compartment.

20. Refrigerating apparatus comprising a cabinet including an insulated storage chamber and an apparatus compartment, a cooling unit in said chamber, a cooling medium supply mechanism for said cooling unit, said supply mechanism including a motor driven pumping unit directly connected to said cooling unit to receive cold cooling medium discharging from said cooling unit whereby to cool said motor.

21. Refrigerating apparatus comprising a cabinet including an insulated storage chamber and an apparatus compartment, a cooling unit in said chamber, a cooling medium supply mechanism for said cooling unit, said supply mechanism including a motor driven pumping unit directly connected to said cooling unit to receive cold cooling medium discharging from said cooling unit whereby to cool said motor, said motor being encased in the insulation of said compartment.

22. Absorption refrigerating apparatus including a condenser, an evaporator including a pair of freezing elements and a space chilling element, a gas circulating fan connected between said chilling element and said freezing elements to discharge into said freezing elements, means providing a gravity flow connection for condensate between said condenser and one of said freezing elements, a gas operated pump connected to divert condensate from said gravity flow connection into the other of said freezing elements, means for conveying pumping gas from the discharge of said fan to said gas operated pump, means for alternately causing said fan to generate sufficient pressure to operate said gas operated pump and to generate insufficient pressure to operate said gas operated pump whereby said freezing elements are alternately operative, and means for decreasing the pressure of the gas discharged by said circulator before it enters said freezing elements.

23. Refrigerating apparatus including a liquid circuit including elements at different elevations, a gas lift pump for elevating liquid from an element at a lower elevation to an element at a higher elevation, means for supplying pumping gas to said gas lift pump, a flow regulator included in said circuit and arranged to receive liquid from said pump, and means for returning all liquid over and above a predetermined quantity to the inlet of said gas lift pump.

24. Refrigerating apparatus including a liquid circuit including elements at different elevations, a gas lift pump for elevating liquid from an element at a lower elevation to an element at a higher elevation, means for supplying pumping gas to said gas lift pump, a flow regulator included in said circuit and arranged to receive liquid from said pump, means for returning all liquid over and above a predetermined quantity to the inlet of said gas lift pump, said flow regulator comprising a receiving portion into which said gas lift pump discharges and a discharge portion connected to discharge into said higher element, and a capillary device arranged to transfer the liquid from said inlet portion to said outlet portion at a measured rate.

25. Refrigerating apparatus including a liquid circuit including elements at different elevations, a twin gas lift pump for elevating liquid from an element at a lower elevation to an element at a higher elevation, means for supplying pumping gas to said twin gas lift pump, a flow regulator included in said circuit and arranged to receive liquid from said pump, means for returning all liquid over and above a predetermined quantity to the inlet of said twin gas lift pump, said flow regulator comprising a receiving portion into which said twin gas lift pump discharges and a discharge portion connected to discharge into said higher element, and a wick arranged to transfer the liquid from said inlet portion to said outlet portion at a measured rate.

26. That improvement in the art of refrigeration which includes the steps of liquefying a refrigerant vapor by abstracting heat therefrom, flowing the liquid by gravity to a first zone in which the liquid is converted to a vapor by the addition of heat thereto, and injecting a gas into the liquid to divert the same from said first zone into a second zone in which the liquid is converted into a vapor by the addition of heat thereto.

27. Refrigerating apparatus comprising a cabinet, means forming a narrow air cooling flue with a wall of said cabinet, an evaporating unit mounted within said cabinet, an air cooled condenser in said flue, means for supplying refrigerant vapor to said condenser, means for conveying liquid refrigerant from said condenser to said evaporator, and a power driven circulator mounted in a wall of said cabinet for circulating a pressure equalizing medium through a circuit including said evaporator, said circulator having a suction connection which is directly connected to said evaporator to receive cold refrigerant vapor and pressure equalizing medium discharging from said evaporator.

28. In an absorption refrigerating system of the three-fluid type utilizing a liquefiable refrigerant, a liquid absorbent for the refrigerant and a gas which is inert with respect to the refrigerant and the absorbent, means forming a path of flow for liquid, means forming a gas circuit having a portion in common with said means forming a path of flow for liquid, said gas circuit and said means forming a path of flow for liquid being so constructed and arranged that the gas passes into the liquid in said portion in common and imparts movement to the liquid to cause the liquid to flow through said portion in common in an amount in excess of the amount of liquid which should flow through said means forming a path of flow for liquid as a whole, and means in said means forming a path of flow for liquid for directing liquid above the amount of liquid which should flow through said means as a whole back to said common portion for recirculation therethrough.

29. In an absorption refrigerating system of the three-fluid type utilizing a liquefiable refrigerant, a liquid absorbent for the refrigerant and a gas which is inert with respect to the refrigerant and the absorbent, means forming a path of flow for liquid, means forming a gas circuit having a portion in common with said means forming a path of flow for liquid, said gas circuit and said means forming a path of flow for liquid being so constructed and arranged that the gas is brought into contact with liquid in said portion in common and imparts movement to the liquid to cause the liquid to flow through said portion in common in an amount in excess of the amount of liquid which should flow through said means forming a path of flow for liquid as a whole and said means forming a path of flow for liquid including means arranged to receive liquid discharged from said portion in common, means for discharging liquid from said receiving means for circulation through said means forming a path of flow for liquid as a whole, and means for directing liquid above the amount which should flow through said means forming a path of flow for liquid as a whole back to said portion in common for recirculation therethrough.

30. Refrigerating apparatus comprising a first element, a second element positioned at an elevation above said first element, means for elevating liquid from said first element to said second element comprising a pumping device having a pumping capacity in excess of the liquid requirements of said second element, and means diverting the excess liquid away from said second element and for returning such excess liquid to the inlet of said pumping device.

31. In a refrigerating apparatus, a liquid circuit having portions thereof positioned at different elevations, means for circulating liquid through said circuit and for controlling the flow of liquid comprising a pump having a capacity in excess of the quantity of liquid to be circulated through said circuit, a receiver arranged to receive liquid from said pump, means for discharging liquid from said receiver for circulation through said circuit, and means for maintaining a constant head of liquid on said discharge means and for returning excess liquid to a portion of said circuit from which the liquid will return to the inlet of said pump.

32. In a refrigerator a gas circuit, means in said gas circuit for raising the pressure of the gas, a liquid circuit, means in said liquid circuit for circulating liquid at a controlled rate comprising a gas lift pump, means for supplying gas at the raised pressure to said pump for operating the same, a receiver arranged to receive liquid discharged by said gas lift pump, means for conveying liquid from said receiver for circulation through said liquid circuit, and means for maintaining a substantially constant head of liquid on said conveying means.

33. In a refrigerator a gas circuit, means in said gas circuit for raising the pressure of the gas, a liquid circuit, means in said liquid circuit for circulating liquid at a controlled rate comprising a gas lift pump, means for supplying gas at the raised pressure to said pump for operating the same, a receiver arranged to receive liquid discharged by said gas lift pump, means for conveying liquid from said receiver for circulation through said liquid circuit, and means for maintaining a substantially constant head of liquid on said conveying means, said last mentioned means being arranged to convey liquid over and above the quantity required to maintain said constant head to the liquid receiving portion of said gas lift pump.

34. In a refrigerator, a gas circuit, means in said gas circuit for raising the pressure of the gas, a liquid circuit, means in said liquid circuit for circulating liquid at a controlled rate comprising a gas lift pump having a pumping rate in excess of said controlled rate, means for supplying gas at the raised pressure to said pump for operating the same, a receiver arranged to receive liquid discharged by said gas lift pump, means for conveying liquid from said receiver for circulation through said liquid circuit, and means for maintaining a substantially constant head of liquid on said conveying means.

GEO. A. BRACE.